United States Patent [19]
Billette et al.

[11] 3,886,799
[45] June 3, 1975

[54] SEMICONDUCTOR PRESSURE TRANSDUCER EMPLOYING TEMPERATURE COMPENSATION CIRCUITS AND NOVEL HEATER CIRCUITRY

[75] Inventors: Richard J. Billette, Dublin; John Vennard, Los Altos, both of Calif.

[73] Assignee: National Semiconductor Corporation, Santa Clara, Calif.

[22] Filed: Sept. 24, 1973

[21] Appl. No.: 399,937

[52] U.S. Cl............. 73/398 AR; 73/88.5 SD; 338/3
[51] Int. Cl. .............................................. G01l 9/04
[58] Field of Search..... 73/88.5 SD, 398 AR; 338/3, 338/4; 317/235 M

[56] References Cited
UNITED STATES PATENTS

| | | | |
|---|---|---|---|
| 3,130,578 | 4/1964 | Ames, Jr. | 73/88.5 R |
| 3,161,045 | 12/1964 | Ames, Jr. | 73/88.5 R |
| 3,808,473 | 4/1974 | Yamashita et al. | 317/235 M |
| 3,820,401 | 6/1974 | Lewis | 73/88.5 SD |

*Primary Examiner*—Charles A. Ruehl
*Attorney, Agent, or Firm*—Lowhurst, Aine & Nolan

[57] ABSTRACT

A semiconductor pressure transducer having a cavity with one thin wall diaphragm on which a piezoresistive bridge is formed of four resistors diffused into the thin wall semiconductor diaphragm and coupled together as a Wheatstone bridge, a voltage regulator including a Zener diode coupled to the bridge, a pair of $nV_{BE}$ circuits coupled to the bridge and the regulator circuit for temperature compensation of the bridge and regulator over the operating temperature range, and a transistor formed in said thin wall diaphragm and comprising a heating circuit thermally well coupled to the piezoresistive bridge to which energy pulses may be delivered to rapidly heat up the thin wall diaphragm.

10 Claims, 6 Drawing Figures

3,886,799

SEMICONDUCTOR PRESSURE TRANSDUCER EMPLOYING TEMPERATURE COMPENSATION CIRCUITS AND NOVEL HEATER CIRCUITRY

BACKGROUND OF THE INVENTION

Pressure transducers have been built utilizing semiconductor integrated circuitry. One such pressure transducer is described in an article entitled "Integration Brings a Generation of Low Cost Transducers" by A. Zias and W. Hare in "Electronics," Dec. 4, 1972, pages 83 to 88. The pressure transducer of the absolute pressure type comprises a 12 mil thick silicon chip having an 11 mil thick N+ type substrate and a 1 mil thick N epitaxial layer grown on the surface of the substrate. A vacuum reference cavity is formed in one portion of the chips by etching into the backside of the thick substrate to leave a thin wall diaphragm of the 1 mil thick N epitaxial layer.

This chip is bonded while under a vacuum to a backplate of silicon 12 mils thick, forming a pressure tight vacuum reference cell, the silicon pressure diaphragm forming one wall thereof.

A Wheatstone bridge arrangement of four piezoresistors is formed in the thin silicon diaphragm, the four resistors being formed by a P diffusion of boron into the N epitaxial layer grown on the silicon chip.

A constant voltage is applied to the pair of input nodes of the bridge, and the voltage output, which is linearly dependent on the pressure applied to the thin diaphragm to unbalance the bridge, is measured at the output node points of the bridge. As the pressure rises, the output voltage rises and thus serves as a measure of this pressure on the sensor, i.e., the resistor bridge on the semiconductor diaphragm.

As described and claimed in a copending U.S. application Ser. No. 400,355 filed Sept. 24, 1973 in the name of A. Zias and J. Solomon entitled "Semiconductor Pressure Transducer Employing Novel Temperature Compensation Means," now U.S. Pat. No. 3,836,796, certain $nV_{BE}$ networks are associated with the piezoresistive pressure sensor bridge and with the Zener diode voltage regulator and are used for temperature compensation of the devices over the desired operating temperature range.

In manufacture, heat must be applied to the sensor device for taking it through a selected temperature range for adjusting the $nV_{BE}$ temperature compensating circuitry. Heating in a temperature oven or the like takes an undesired length of time, especially when manufacture on a production line basis.

SUMMARY OF THE PRESENT INVENTION

The present invention provides a pressure transducer utilizing a silicon chip diaphragm sensor including a four arm piezoresistor bridge element, with an $nV_{BE}$ network employed to temperature compensate the bridge over the operating temperature range of the device. In order to apply the desired heating to the thin silicon diaphragm, a transistor is fabricated on the thin silicon diaphragm, preferably within the confines of the four arm piezoresistor bridge, the transistor being supplied with one or more energy pulses to rapidly heat the silicon chip diaphragm over the desired temperature range. In a preferred embodiment of the invention, the collector of the heater transistor is coupled to a common collector node with transistors utilized in the temperature compensation circuits of the device.

DESCRIPTION OF THE PREFERRED EMBODIMENTS

Figure 1:
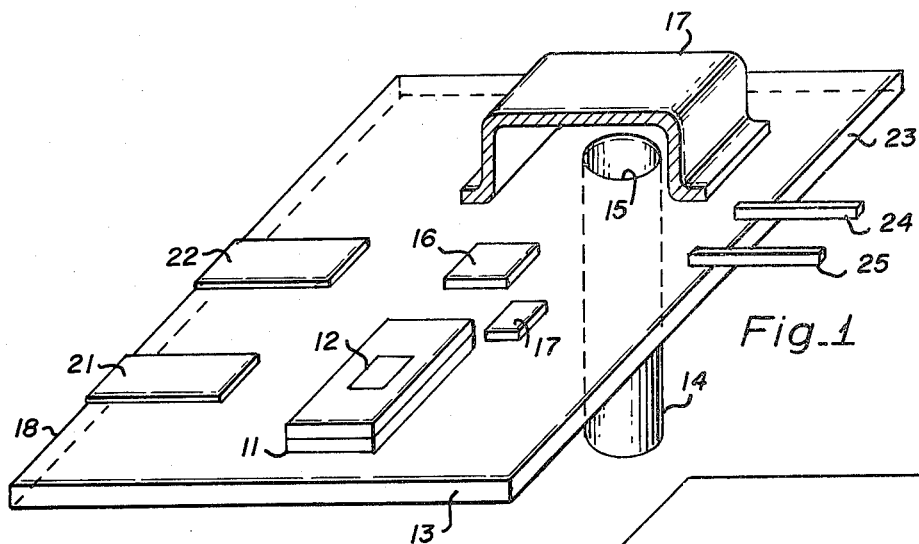
FIG. 1 is a perspective view of the pressure transducer apparatus incorporating the present invention.

FIG. 1 illustrates the pressure transducer of the present invention including a semiconductor pressure sensor structure 11 having a piezoresistive bridge 12 formed by the P diffusion of four resistor arms into the N epitaxial layer grown on a P substrate. The pressure sensor structure is affixed to a ceramic plate. A pressure tube connector 14 is sealed to the under side of the plate 13 and over an opening 15 in the plate 13 leading to the sensor region. The ceramic plate also has affixed thereto a buffer amplifier 16 (a 747 operating at unity gain) and a 741 operational amplifier 17 that raises the output signal received from the bridge 12 via the buffer amplifier 16 to the desired output level. A typical output voltage range is 2.5 to 12.5 volts for a pressure range from 0 to 30 psi.

The region of the plate 13 including the pressure tube hole 15 and the sensor structure 11 is covered by and sealed under a suitable metal cover 17. A number of thick film, trimmable resistors are positioned along one edge 18 of the ceramic plate 13 and outside of the evacuated cover region. Only two such resistors 21 and 22 are illustrated. Input and output terminal leads are positioned along the other edge 23 of the plate; only two such leads 24 and 25 are illustrated.

Figure 2:
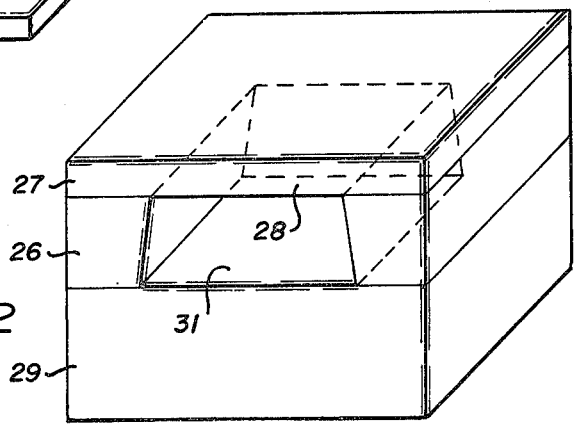
FIG. 2 is a cross sectional view taken through the cavity portion of the semiconductor body included in the device of FIG. 1 showing the thin flexible diaphragm wall of the cavity.

In FIG. 2 there is shown a cross sectional view taken through the semiconductor body 11 which includes a N+ type substrate 26 about 11 mils thick on which a 1 mil thick N type epitaxial layer 27 is grown. The N+ type material 26 under a central region of the wafer 26, 27 is etched away to serve as the reference cavity, leaving only the 1 mil thick N epitaxial layer in this region to serve as the diaphragm 28. Portions 26, 27, 28 are of one single crystal of silicon. This upper semiconductor body portion 26, 27, 28 is then sealed with a suitable bonding material under vacuum to a second semiconductor chip 29 which forms a backing plate for the upper semiconductor chip 26, 27, 28. Where the pressure transducer is to serve as a gage device rather than an absolute pressure transducer, a hole is made through the backing chip 29 and extending into the cavity region 31 to expose the cavity region under the diaphragm 28 to the local ambient pressure. It should be noted that the structure shown is not drawn to scale; the semiconductor body including the top portion 26, 27, 28 and the backing chip is about 0.115 inch × 0.165 inch and about 24 mils thick. The cavity dimensions are about 11 mils thick and 0.060 inch × 0.115 inch. It should also be noted that all the above processes are performed upon a wafer or slice containing hundreds of such devices at once.

Figure 3:
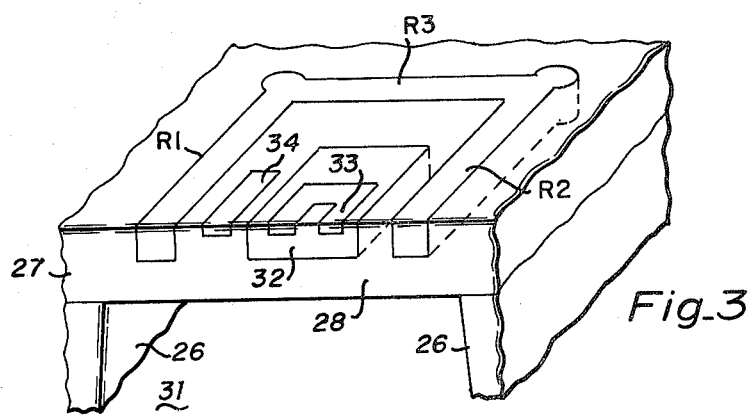
FIG. 3 is a view similar to FIG. 2 showing a portion of the piezoresistor bridge circuit diffused into the thin wall diaphragm as well as a transistor circuit formed within the bridge circuit on the diaphragm.

There is shown in FIG. 3 an enlarged cross section view of the 1 mil thick N epitaxial layer 27 forming the pressure sensor diaphragm 28 and illustrating three of the four resistors (R1, R2, R3 and R4) forming the four arms of this piezoresistive bridge circuit 12 on the diaphragm 28. These resistors are formed by P type diffusion, e.g., boron, in the N epitaxial layer. There is also shown formed within the boundaries of the bridge 12 a transistor Q1 comprising a P diffused base 32, an N+ diffused emitter region 33, and an N+ type collector connector 34 diffusion serving to connect with the common collector region of the transistor formed by the N epitaxial layer.

Figure 4:
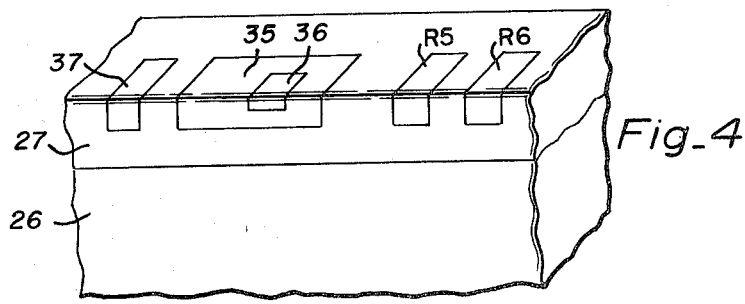
FIG. 4 is a cross section view of another portion of the semiconductor body showing another transistor structure and two diffused resistors formed in the semiconductor body.

FIG. 4 illustrates another portion of the semiconductor chip structure 11 spaced from the cavity region 31, said other portion having a transistor Q2 formed in the N epitaxial layer 27 comprising a P diffused base region 35, coupling to the common collector N epitaxial layer 27. The P diffused resistors R5 and R6 are also shown formed in the N epitaxial layer 27.

Figure 5:
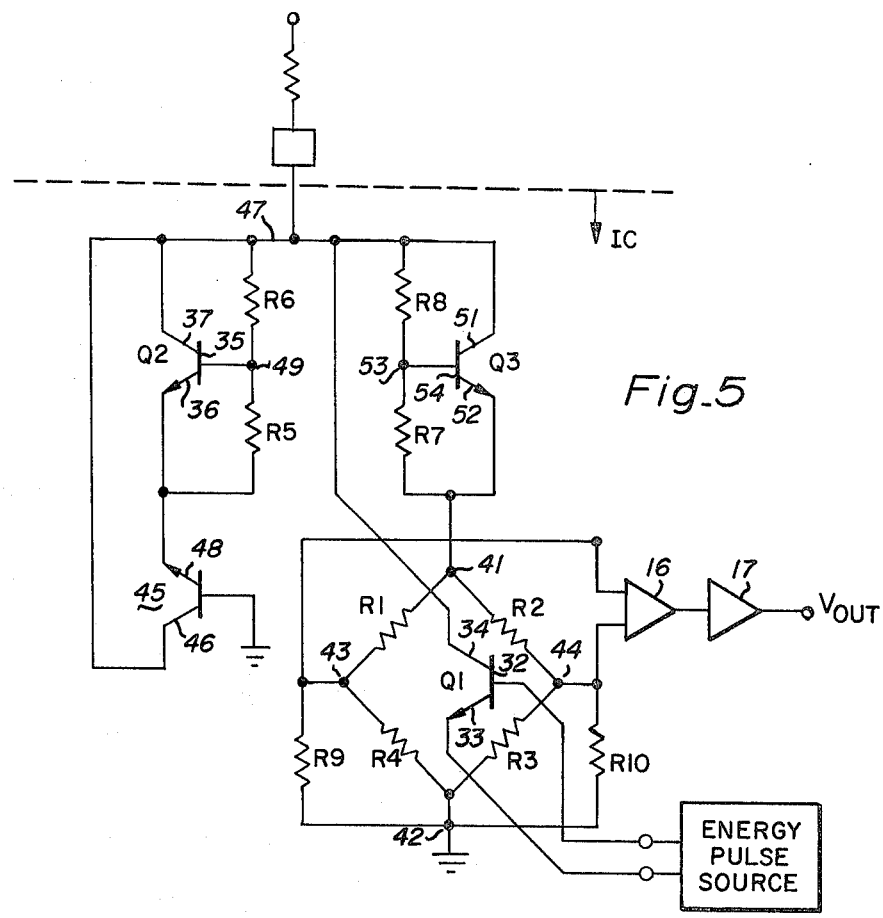
FIG. 5 is a schematic diagram illustrating the temperature compensation circuits employed with the Zener diode voltage regulator circuit and with the piezoresistive bridge circuit of the semiconductor pressure transducer.

The schematic diagram of the piezoresistive bridge and associated circuitry is shown in FIG. 5 and comprises the four equal value diffused resistors R1–R4 coupled at the corners as shown to form a four piezoresistor arm bridge circuit with a voltage input coupled across the bridge at input node 41 and grounded input node 42. The two output nodes 43 and 44 of the bridge lead to the output circuit including the 747 buffer amplifier 16 and the 741 operational amplifier 17.

This circuit also includes a voltage regulator circuit for the bridge comprising the Zener diode 45 formed by the reverse biased emitter-base junction of a standard NPN transistor such as formed in the N epitaxial layer. This Zener diode is formed in the same manner as the two transistors Q1 and Q2, and all of these devices have a common collector formed by the N epitaxial layer on the chip; the collector 46 of the Zener diode is thus shown coupled to the common collector node 47. For a typical device, the Zener diode has a breakdown voltage of approximately 6.4V, and with this breakdown characteristic, it has associated with it a positive temperature coefficient of about + 2.5 mv/C°.

It is desired that the applied voltage regulated by this Zener diode 45 and appearing as the applied voltage on the common collector node 47 be maintained constant over the operating temperature range of the device, from for example −40°C to + 125°C. The Zener diode is therefore provided with a temperature compensation circuit comprising an $nV_{BE}$ network including the transistor Q2 having its emitter 36 coupled to the emitter 48 of the Zener diode and its collector 37 coupled to the common collector node 47. A pair of resistors R5 and R6 comprising the two P diffused resistors in the N epitaxial layer 27 are connected in series between the common collector node 47 and the emitter 48 of transistor Q2, with the junction node 49 between the two resistors R5 and R6 coupled to the base 35 of the transistor Q2. This $nV_{BE}$ network thus consists of the transistor Q2, resistor R5, and resistor R6 with a value of $(n_1-1)$ R5. Q2 is thermally well coupled to Zener diode 45 so as to properly track its temperature change.

By the proper selection of the value of $n_1$, the circuit produces a negative temperature coefficient (i.e., −2.5 mv/C°) just sufficient to cancel out the positive temperature coefficient of the Zener diode 45 over the operating temperature range. A typical value from n is 1.25, an irrational number. Thus an irrational number of the BE diode drops are provided from this $nV_{BE}$ network to serve as the temperature compensation for this Zener diode 45 to maintain the voltage applied at the node 47 constant.

The piezoresistive bridge formed by R1–R4 also has a positive temperature coefficient of about + 1200 ppm/C° and a second $nV_{BE}$ network comprising the transistor Q3 and two resistors R7 and R8 are provided to balance out this bridge temperature coefficient. This $nV_{BE}$ network temperature compensation network comprises a transistor Q3 having its collector 51 coupled to the common collector node 47, at which the applied voltage is held constant by the Zener voltage regulator circuit, and its emitter 52 coupled to the voltage input node 41 of the piezoresistive bridge. Two resistors R7 and R8 are connected in series between the applied voltage node 47 and the bridge input node 41, the junction points 53 between the two resistors R7 and R8 being coupled to the base 54 of the transistor Q3. The resistor R8 has a value equal to $(n_2-1)$ R7 and by proper establishment of the value of $n_2$, the circuit will produce a temperature coefficient just sufficient to cancel out the Span TC, which is mainly composed of the temperature coefficient of resistance of the bridge. Q3 is thermally well coupled to the piezoresistive bridge to properly track its temperature change.

The two resistors R7 and R8 are thick film resistors (such as 21 and 22) located outside the area of the sealed cover 17 on the ceramic plate and they may be adjusted in value during manufacture and test by trimming the resistor with a laser trimming apparatus controlled either manually or by a computer control. As the temperature of the bridge sensor is changed, the output voltage is measured and the thick film resistors are trimmed relative to their ratio until the correct $n_2$ $V_{BE}$ value is obtained to give the desired temperature coefficient for the $nV_{BE}$ network associated with the resistor bridge circuit.

Figure 6:
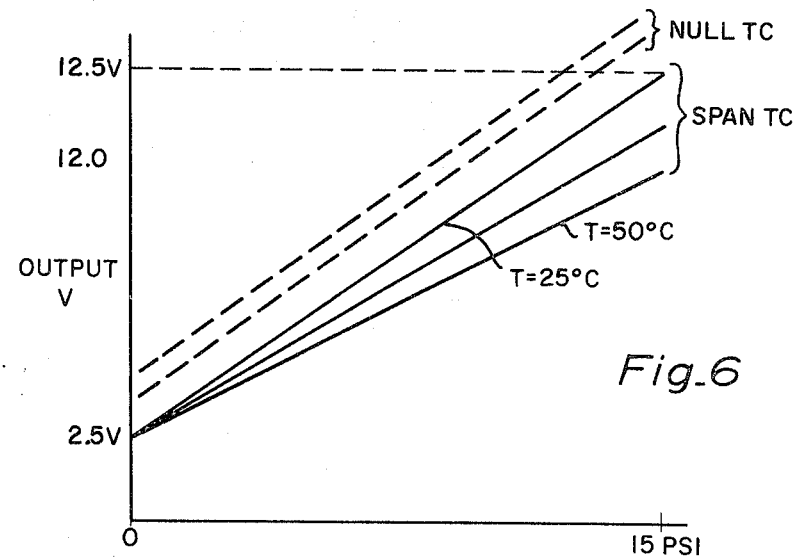
FIG. 6 is a graph illustrating span and null temperature compensation for the bridge.

This latter adjustment is termed the span temperature compensation adjust and is illustrated in FIG. 6 which shows a plot of the output voltage V versus the pressure applied to the diaphragm and the effect of the temperature compensation on the results. At a constant temperature of 25°C, the output voltage varies along a slope line from 2.5 volts to 12.5 volts, over a selected pressure range of 0 to 15 psi. The same trace at 50°C shows that the end output voltage is lower, for example 12.0 volts, and thus indicates a negative temperature coefficient of 500 milliwatts at the 50°C value, or a change of 5 percent. By trimming to adjust the ratio of the resistors R7 and R8, the slope of the span line trace at 50°C may be moved closer to the trace from 2.5V to 12.5V and the output voltage can be made to approach the desired 12.5 volts, with acceptable small deviation, over the operating pressure range for all values over the operating temperature range.

In addition to span temperature coefficient, there is a null temperature coefficient that is illustrated by the traces on the graph of FIG. 6 which are parallel dash lines above the trace from 2.5V to 12.5. The null temperature coefficient shifts the output lines from the desired trace from 2.5V output to 12.5V output to some higher or lower output start and finish value, for example, a 0.3 or 0.5 volts difference. By heating the semiconductor diaphragm and measuring the voltage output, this null temperature coefficient can be measured. The two thick film resistors R9 and R10 coupled across the output nodes 43 and 49 of the bridge to the grounded input node 42 can be adjusted in ratio R9/R10 to bring the null temperature coefficient line down to the desired value extending between the output range from 2.5 volts to 12.5 volts.

During these applied temperature span and null adjustment processes, the transducer apparatus may be placed into a heat chamber and brought up through the desired temperature range. A more preferred method for heating the silicon diaphragm 28 is to incorporate a transistor Q1 on the silicon diaphragm 28 and preferably within the boundaries of the four arm piezoresistor bridge as shown in FIG. 3. The thermal resistance of the very thin diaphragm 29 is about 300°C/watt and the thermal time constant is about 100 milliseconds. Applying an energy pulse to heat the diaphragm simulates placing the device in a heat chamber; however, the desired temperature change is effected in a very short time period. For example, the temperature of the sensor may be raised from 25°C to 150°C in about 100 milliseconds. The voltage output of the bridge may be measured cold, or at 25°C, and then again measured at the elevated temperature to give the desired temperature range in a short time interval. This is important when manufacturing and calibrating large numbers of devices, particularly where computer controlled laser trimming of the thick film resistors R7, R8, R9 and R10 is employed.

This temperature inducing transistor is shown in FIG. 5 and comprises the base 32 diffused into the N epitaxial layer 27 serving as the common collector, coupled to the collector contact 34, and an emitter 38 diffused in to the base region. The emitter and base are brought out to output leads 56 and 57 which may be employed to receive the energy pulses needed to heat the diaphragm.

What is claimed is:

1. A semiconductor pressure transducer apparatus comprising
   a semiconductor body comprising a substrate and a surface layer of a material of a first conductivity type, said body having a cavity region formed therein, said cavity region including a thin wall section formed by a section of said surface layer, said thin wall section being flexible responsive to pressure exerted across said thin wall section,
   an electrical bridge circuit formed in said thin wall section of said surface layer and comprising four resistor arms, two opposed nodes of said bridge forming a bridge input, the two other opposed nodes of said bridge forming a bridge output, each of said bridge resistors being formed by a diffusion of a dopant of opposite conductivity type to that of the surface layer into said thin semiconductor wall section,
   circuit means for applying a voltage to the input nodes of said bridge circuit, said circuit means including a common collector node formed by said layer of said semiconductor material of said first conductivity type,
   a Zener diode formed in said surface layer comprising an emitter, a collector coupled to said common collector node, and a base coupled to one input node of said bridge,
   a temperature compensation circuit for said Zener diode comprising
     a first transistor formed in said surface layer having an emitter coupled to the emitter of said Zener diode, a base, and a collector coupled to said common collector node, and a pair of resistors coupled in series between said common collector node and the emitter of said first transistor, the junction node between said two resistors being coupled to the base of said first transistor,
   a temperature compensation circuit coupled between another input node of said bridge and said common collector node comprising
     a second transistor formed in said surface layer having an emitter coupled to said other bridge input node, a collector coupled to said common collector node, and a base, and
     a pair of resistors coupled in series between said common collector node and the emitter of said second transistor, the junction node between said two resistors being coupled to the base of said second transistor, and
   a heating circuit thermally well coupled to the piezoresistor bridge for heating the thin wall section for the cavity region comprising a transistor formed in said thin wall section comprising
     a base region diffused in said surface layer,
     an emitter diffused in said base region, and
     a collector region common to said common collector node, said base and emitter region having output leads to which energy pulses may be applied to heat the thin semiconductor wall section.

2. A semiconductor pressure transducer apparatus as claimed in claim 1 wherein said heating circuit transistor is formed in said thin wall section within the confines of said four resistor arm bridge circuit.

3. A semiconductor pressure transducer apparatus as claimed in claim 2 wherein the collectors of said Zener diode, said first and second transistors and said heater transistor are formed by the surface layer of said second conductivity type on said substrate, the base regions of said Zener diode, said first and second transistors, and said heater transistor are formed by diffusions of a material of said first conductivity type into said surface layer, and the emitters of said Zener diode, said first and second transistors, and said heater transistor are formed by a diffusion of a material of said second conductivity type into the associated base regions.

4. A semiconductor pressure transducer apparatus as claimed in claim 2 including a ceramic plate on which said semiconductor body is mounted, said pair of resistors in said temperature compensation circuit for said Zener diode being formed by the diffusion of regions of a material of said opposite conductivity type into said surface layer of said first conductivity type on said substrate, and said pair of resistors in said temperature compensation circuit for said bridge circuit being formed by trimmable thick film resistor material on said ceramic plate.

5. A semiconductor pressure transducer apparatus comprising:
 a semiconductor body comprising a substrate and a surface layer of a material of a first conductivity type, said body having a cavity region formed therein, said cavity region including a thin wall section formed by a section of said surface layer, said thin wall section being flexible responsive to pressure exerted across said thin wall section;
 an electrical bridge circuit formed in said thin wall section of said surface layer and comprising four resistor arms, two opposed nodes of said bridge forming a bridge input, the two other opposed nodes of said bridge forming a bridge output, each of said bridge resistors being formed by a diffusion of a dopant of opposite conductivity type to that of the surface layer into said thin semiconductor wall section;
 circuit means for applying a voltage to the input nodes of said bridge circuit, said circuit means including a common collector node formed by said layer of said semiconductor material of said first conductivity type;
 a voltage regulator circuit coupled across said common collector node and one input node of said bridge;
 a temperature compensation circuit for said bridge coupled between another input node of said bridge and said common collector node comprising:
  a transistor formed in said surface layer having an emitter coupled to said other bridge input node, a collector coupled to said common collector node, and a base, and
  a pair of resistors coupled in series between said common collector node and the emitter of said transistor, the junction node between said two resistors being coupled to the base of said transistor, and
 a heating circuit thermally well coupled to the piezoresistor bridge for heating the thin wall section for the cavity region comprising a transistor formed in said thin wall section comprising:
  a base region diffused in said surface layer,
  an emitter diffused in said base region, and
  a collector region common to said common collector node, said base and emitter region having output leads to which energy pulses may be applied to heat the thin semiconductor wall section.

6. A semiconductor pressure transducer apparatus as claimed in claim 5 wherein said heating circuit transistor is formed in said thin wall section within the confines of said four resistor arm bridge circuit.

7. A semiconductor pressure transducer apparatus as claimed in claim 6 wherein the collectors of said temperature compensation transistor and said heater transistor are formed by the surface layer of said second conductivity type on said substrate, the base regions of said two transistors are formed by diffusions of a material of said first conductivity type into said surface layer, and the emitters of said two transistors are formed by a diffusion of a material of said second conductivity type into the associated base regions.

8. A semiconductor pressure transducer apparatus as claimed in claim 6 including a ceramic plate on which said semiconductor body is mounted, and said pair of resistors in said temperature compensation circuit for said bridge circuit being formed by trimmable thick film resistor material on said ceramic plate.

9. A semiconductor pressure transducer apparatus as claimed in claim 5 including circuit means for adjusting the null temperature coefficient of said bridge, said latter circuit means including a first resistor coupled across one bridge resistor from one output node to one input node, and a second resistor coupled across a second bridge resistor from a second output node to said one input node.

10. A semiconductor pressure transducer apparatus as claimed in claim 9 wherein said heating circuit tranistor is formed in said thin wall section within the confines of said four resistor arm bridge circuit.

\* \* \* \* \*